July 8, 1947.  E. A. STALKER  2,423,733
ROTARY WING AIRCRAFT WITH MECHANICAL BALANCING FOR FLAPPING
Filed July 16, 1943
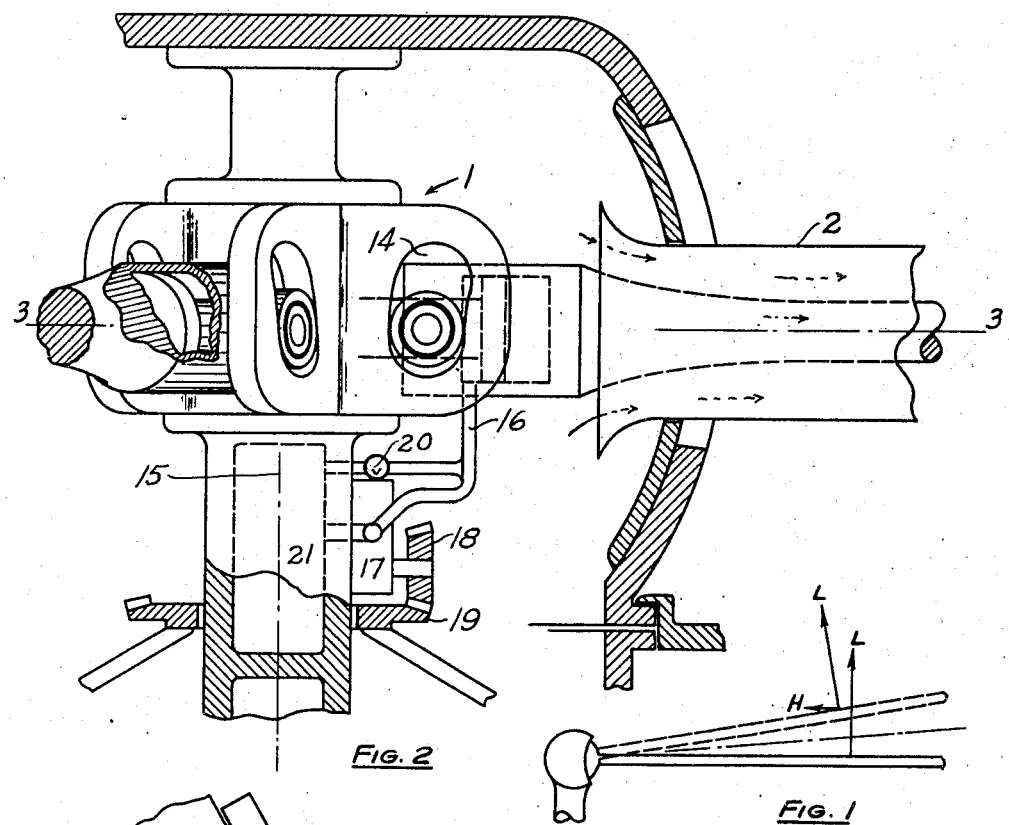
FIG. 2
FIG. 1
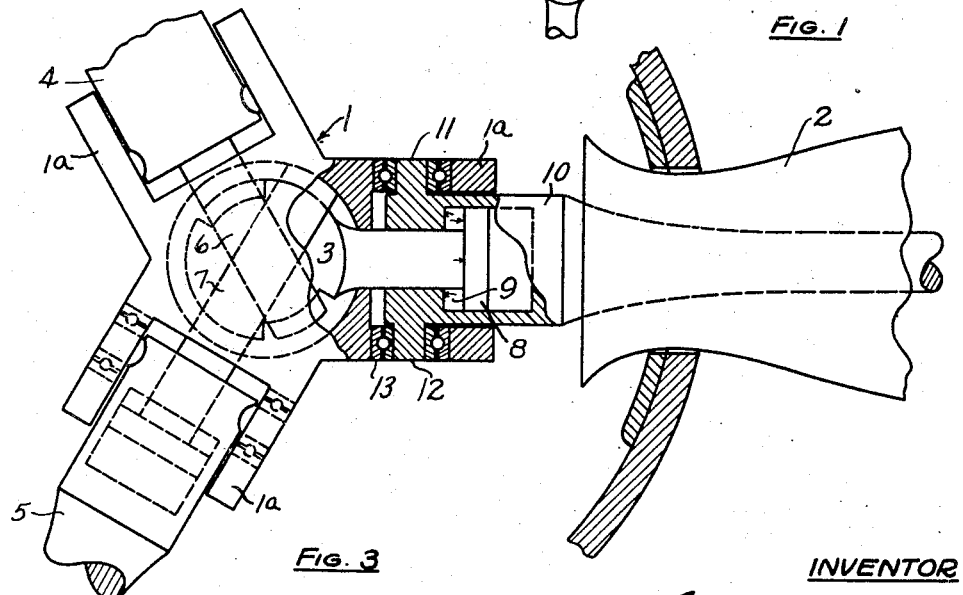
FIG. 3
INVENTOR
Edward A. Stalker
By Marechal & Biebel
ATTORNEYS Patented July 8, 1947

2,423,733

UNITED STATES PATENT OFFICE 2,423,733

ROTARY WING AIRCRAFT WITH MECHANICAL BALANCING FOR FLAPPING

Edward A. Stalker, Bay City, Mich.

Application July 16, 1943, Serial No. 494,914

12 Claims. (Cl. 170—160)

My invention relates to direct lift aircraft and particularly to helicopter rotors. It has for its objects to provide a helicopter rotor in which the periodic generation of objectionable vibration forces arising from flapping of the blades is greatly minimized or overcome with resulting smooth operation.

It is a further object to provide a mechanism for this purpose which is simple in construction and operation, which is constructed for long life, and which operates efficiently and with a minimum requirement of energy.

Other objects will appear from the following description, the accompanying drawings and the appended claims.

Referring to the drawing which illustrates a preferred embodiment of the invention, Fig. 1 is a diagrammatic view showing the force vectors which are present in a helicopter blade;

Fig. 2 is a fragmentary vertical section through the axis of rotation of a helicopter rotor constructed in accordance with the present invention; and Fig. 3 is a horizontal fragmentary section through the rotor along the line 3—3 in Fig. 2.

As shown in Fig. 1 when the blade of the rotor of a helicopter flaps upward the lift force which acts susbtantially normal to the blade span gives a horizontal force component H which acts toward the axis of rotation when the blade is above the horizontal. This force component varies in magnitude as the blade rotates about the vertical axis by reason of the difference in the flapping angle of the blade and results in a periodic force which if not properly balanced causes objectionable vibration. In accordance with this invention, such vibration is minimized or overcome by balancing the horizontal force against a centrifugal force developed in the blade itself, and controlled as to amount by shifting the center of gravity of the blade in the course of its rotation and as determined by its flapping position.

The outward movement of the center of gravity of the blade may be accomplished by the construction shown in Figs. 2 and 3. The rotor hub is 1 and the rotor blade is 2. The blade is adjustably held in the hub by the spherical element 3 fitting inside the spherical cavity of 1. The other blades 4 and 5 have the spherical segments or shoes 6 and 7 at their ends which fit about the element 3 as described in my U. S. Patent No. 2,084,464 so that each of the blades is free to flap vertically relative to the hub, the blades each being fixed relative to the remaining blades by the blade sockets 1a formed in the hub 1.

In order to effect the desired shift in the center of gravity of the blades, the shoes are adjustably joined to the blades through the agency of the piston such as 8 of blade 2. The piston fits within the cylinder 9 formed in the inner end of the blade tongue 10. The blade tongue has the stub shafts 11 and 12 which carry the ball-bearings 13. The outer races of these bearings bear on the walls of the slots 14 formed in blade sockets 1a and are adapted to travel in the slots in response to the flapping movement of the individual blades. These slots 14 are shaped so that an upward flapping movement of the blade moves the blade tongue and with it the blade longitudinally outward from the axis of rotation 15. Thus the center of gravity of the blade in this position is shifted and the centrifugal force of the blade is increased to offset the inward aerodynamic force H.

The slots 14 may likewise be shaped to move the blade in the proper direction to develop a balancing centrifugal force effect when the block descends below its horizontal position, the slots being properly contoured at all points to bring about the desired balancing conditions.

In order that the force on the face of the slot 14 may be small, and hence the frictional losses reduced to a minimum, fluid pressure is applied to the head of cylinder 9 by way of tube 16 leading from the pump 17 which rotates about the vertical axis with the rotor and is driven by the rotor through the gears 18 and 19, the latter fixed to the stationary structure of the aircraft. A spring loaded valve 20 permits fluid to return to the reservoir 21 if the pump pressure attains too high a value. The pump also draws its fluid from the reservoir. The fluid employed by the pump may be either incompressible or elastic. It is also possible to replace the fluid with a spring which would be precompressed within the cylinder 9 and bearing on the cylinder head and the piston, the fluid pressure however being preferred. With this construction the principal part of the centrifugal load is transferred directly to the hub and balanced by the forces on the other blades, and only a relatively small part of such forces are required to be transmitted through the bearings 13.

It will now be clear that a novel and simple means of eliminating the force which would cause vibration of the rotor and the aircraft of which it is a part has been provided. It is simple in construction and operation, is applicable to a rotor having any number of blades, and does not add to the weight of the aircraft. Furthermore it is highly efficient and does not entail high frictional losses or excessive loads on the adjusting mechanism.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft of the direct lift type, a blade, means for supporting said blade on the aircraft for rotation about an upright axis, additional means for supporting said blade for flapping movement with respect to said axis, said flapping movement producing a force acting in a direction transverse to said axis, means providing for displacing the center of gravity of said blade relative to said upright axis, and means movable in coordinated relation with said flapping movement and cooperating with said displacing means for causing displacement of the center of gravity of said blade to develop a centrifugal force component opposing and substantially balancing said transverse force.

2. In an aircraft of the direct lift type, a blade, means for supporting said blade on the aircraft for rotation about an upright axis, additional means for supporting said blade for flapping movement with respect to said axis, said flapping movement producing a force acting in a direction transverse to said axis, means located on the same side of the axis of rotation as the blade providing for displacing the center of gravity of said blade relative to said upright axis, and means movable in coordinated relation with said flapping movement and cooperating with said displacing means for causing displacement of the center of gravity of said blade to develop a centrifugal force component opposing and substantially balancing said transverse force.

3. In an aircraft of the direct lift type, a blade, means for supporting said blade on the aircraft for rotation about an upright axis, additional means for supporting said blade for flapping movement with respect to said axis, said flapping movement producing a force acting in a direction transverse to said axis, means responsive to the flapping position of said blade, and means controlled by said responsive means as a function of said flapping position of said blade for shifting said blade radially of said upright axis to develop a centrifugal force substantially equal and opposite to said transverse force.

4. In an aircraft of the direct lift type, a blade, means for supporting said blade on the aircraft for rotation about an upright axis, additional means for supporting said blade for flapping movement with respect to said axis, said flapping movement producing a force acting in a direction transverse to said axis, and mechanical interconnections effective between said blade and said supporting means and controlled in accordance with said flapping movement for effecting displacing of the center of gravity of said blade to develop a centrifugal force therein substantially balancing said transverse force.

5. In an aircraft of the direct lift type, a blade, a hub, means for supporting said blade on said hub for rotation about an upright axis, means for supporting said blade for flapping movement with respect to said axis, said flapping movement producing a force acting in a direction transverse to said axis, means providing for movement of said blade radially of said hub, and means responsive to upward flapping movement of said blade to cause said last mentioned means to move said blade radially outward to develop an increased centrifugal force effect on said blade substantially balancing said transverse force.

6. In an aircraft of the direct lift type, a blade, means for supporting said blade on the aircraft for rotation about an upright axis, means for supporting said blade for flapping movement with respect to said axis, said flapping movement producing a force acting in a direction transverse to said axis, guide means for shifting the blade in a direction substantially lengthwise of its longitudinal axis in accordance with its flapping position, and means for relieving said guide means of at least a part of the centrifugal force of said blade.

7. In an aircraft of the direct lift type, a blade, a hub means for supporting said blade on said hub for rotation about an upright axis, means for supporting said blade for flapping movement with respect to said axis, said flapping movement producing a force acting in a direction transverse to said axis, guide means fixed to said hub and having contoured guide surfaces formed therein for moving said blade toward and away from said axis, means carried by said blade and operable in response to said flapping movement for engaging said guide surfaces to control the movement of said blade toward and away from said upright axis in response to the flapping position of said blade.

8. In an aircraft of the direct lift type, a blade, a hub means for supporting said blade on said hub for rotation about an upright axis, means for supporting said blade for flapping movement with respect to said axis, said flapping movement producing a force acting in a direction transverse to said axis, guide means fixed to said hub and having contoured guide surfaces formed therein for moving said blade toward and away from said axis, means carried by said blade and engaging said guide surfaces for controlling the movement of said blade toward and away from said upright axis in response to the flapping position of said blade, and a yieldable cushion for opposing the centrifugal force of said blade and relieving said guide surfaces of at least a part of said force.

9. In combination in an aircraft, a plurality of blades, means to support said blades on the aircraft for rotation about an upright axis, means for supporting said blades for independent vertical flapping movement, the flapping movement of each said blade producing an unbalanced force acting transverse to said upright axis, means for causing displacement of the center of gravity of each said blade independently with reference to said upright axis, and means movable in coordinated relation with the flapping movement of each said blade and cooperating with the displacing means of the same said blade for causing displacement of the center of gravity of said blade to develop a centrifugal force component opposing and substantially balancing said transverse force.

10. In combination in an aircraft, a blade, a hub supported on the aircraft for rotation about an upright axis, means for supporting said blade on said hub for vertical flapping movement, means connecting said blade to said hub for adjustment of the blade position radially relative to said upright axis including means defining a contoured slot on said hub, said blade having a part slidable in and guided by said slot to shift the radial position of said blade as a function of the angle of flap of said blade.

11. In combination in an aircraft, a blade, a hub supported on the aircraft for rotation about an upright axis, means for supporting said blade on said hub for vertical flapping movement, means connecting said blade to said hub for adjustment of the blade position radially relative to said upright axis including means defining a contoured slot on said hub, said blade having a part slidable in and guided by said slot to shift the radial position of said blade as a function of the angle of flap of said blade, and yieldable means to relieve the side wall of said slot from at least a part of the centrifugal force of said blade.

12. In combination in an aircraft, a blade, a hub supported on the aircraft for rotation about an upright axis, means for supporting said blade on said hub for vertical flapping movement, means connecting said blade to said hub for adjustment of the blade position radially relative to said axis, and cam means on said hub for moving said blade radially outward in response to upward flapping movement of said blade.

EDWARD A. STALKER.

REFERENCES CITED

The following references are of record in the file of this patent:

UNITED STATES PATENTS

| Number | Name | Date |
| --- | --- | --- |
| 1,922,866 | Rosenberg et al. | Aug. 15, 1933 |
| 2,108,245 | Ash | Feb. 15, 1938 |
| 2,173,291 | Ash | Sept. 19, 1939 |